United States Patent Office 3,134,776
Patented May 26, 1964

---

3,134,776
4-AMINO-8,9-DIHYDRO-2-ARYLBENZO(g)
PTERIDIN-6(7H)-ONES
Thomas S. Osdene, West Chester, and Arthur A. Santilli, Ardmore, Pa., assignors to American Home Products Corporation, New York, N.Y., a corporation of Delaware
No Drawing. Filed Nov. 20, 1962, Ser. No. 239,066
2 Claims. (Cl. 260—251.5)

The present invention is concerned with novel pteridine derivatives having important antiviral properties and with methods for the production thereof.

More specifically, this invention relates to new 4-amino-8,9-dihydro-2-arylbenzo (g) pteridin-6(7H)-ones, the letter "g" being used to locate the point of attachment of the benzo moiety to the pteridine ring.

The compounds sought to be patented are represented by the formula:

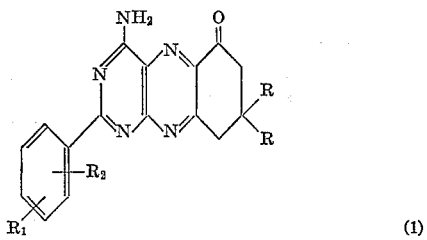

(1)

wherein R represents hydrogen or lower alkyl, $R_1$ and $R_2$ may be the same or different and represent hydrogen, lower alkyl, lower alkoxy, trifluoromethyl or halogen having an atomic weight less than 80. By lower alkyl and lower alkoxy are meant straight chained or branched radicals having from 1 to 4 carbon atoms.

Several methods for making the compounds sought to be patented are available to those skilled in the art. The preferred method, hereinafter called Method A, comprises reacting a 4,6-diamino-2-aryl-5-nitrosopyrimidine (II) with a 1,3-cyclohexanedione (III). The reaction is preferably conducted in a solvent such as glacial acetic acid, at or near the boiling point of the selected solvent in the presence of sodium acetate or potassium acetate. The reaction time is generally around one to one and a half hours. Following the reaction, the mixture is concentrated to a smaller volume and subsequently diluted by the addition of water. The diluted mixture is neutralized with base and the product is purified by recrystallization from a suitable solvent such as 2-ethoxyethanol.

Method A can be schematically illustrated as follows:

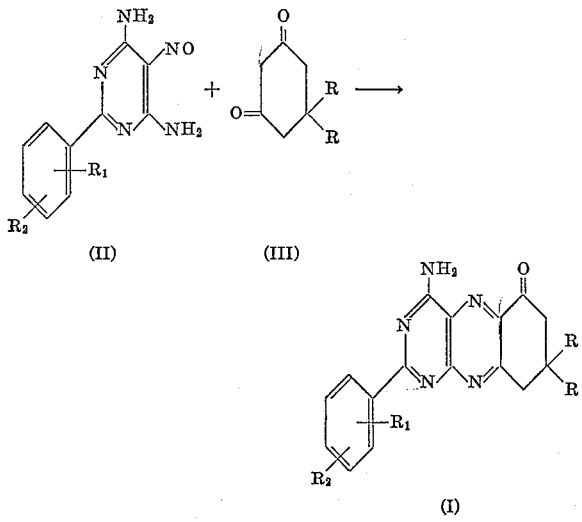

In the above formulas, R, $R_1$ and $R_2$ have the same meaning previously set forth.

In another method according to this invention, Method B, reactants II and III above, are intimately commingled and heated to reaction temperature usually around 150° C., in the absence of a solvent. The onset of the reaction is signalled by the vigorous evolution of steam. After cooling the reaction mixture, a lower alkanol such as ethanol is added to the reaction mass. The precipitated solids are then filtered and recrystallized as in Method A, above.

The following examples illustrate the best mode of carrying out the invention.

Example 1

A mixture of 6.45 g. of 4,6-diamino-5-nitroso-2-phenylprimidine, 4.62 g. of 5,5-dimethyl-1,3-cyclohexanedione and 4.5 g. of anhydrous sodium acetate in 200 ml. of glacial acetic acid was boiled under reflux for 1½ hours. The reaction mixture was then concentrated to a smaller volume on a rotary evaporator and then was diluted with 100 ml. of water. The mixture was neutralized with concentrated ammonia solution and the brown solid thus obtained was removed by filtration, and washed several times with ether. Recrystallization from 2-ethoxyethanol and petroleum ether gave 4-amino-8,9-dihydro-8, 8-dimethyl - 2 - phenylbenzo (g) pteridin-6(7H)-one, M.P. 334–335° C.

Analysis.—Calculated: C, 67.69; H, 5.37; N, 21.93. Found: C, 67.66; H, 5.26; N, 21.49.

Example 2

An intimate mixture of 6.45 g. of 4,6-diamino-5-nitroso-2-phenylpyrimidine and 4.8 g. of 5,5-dimethyl-1,3-cyclohexanedione was placed into a large test tube and immersed in an oil bath maintained at 150° C. A vigorous reaction occurred and after 30 minutes in the bath the reaction had ceased. The melt was then treated with 200 ml. of ethanol and the solid was removed by filtration. Recrystallization of the product afforded 4-amino-8,9-dihydro - 8,8 - dimethyl - 2 - phenylbenzo($g$) pteridin-6(7H)-one, M.P. 336–337° C. A mixed melting point with the sample previously prepared showed no depression.

Example 3

Reaction of 6.45 g. of 4,6-diamino-5-nitroso-2-phenylpyrimidine with 3.7 g. of 1,3-cyclohexanedione as described in Example 1 gives 4-amino-8,9-dihydro-2-phenylbenzo($g$)pteridin-6(7H)-one.

Example 4

Reaction of 7.48 g. of 4,6-diamino-2-(p-chlorophenyl)-5-nitrosopyrimidine with 4.62 g. of 5,5-dimethyl-1,3-cyclohexanedione gives 4-amino-8,9-dihydro-8,8-dimethyl-2-(p-chlorophenyl)benzo(g)pteridin-6-(7H)-one by following essentially the procedure of Example 2.

Example 5

Reaction of 6.87 g. of 4,6-diamino-5-nitroso-2-(p-toyly) pyrimidine with 4.62 g. of 5,5-dimethyl-1,3-cyclohexanedione gives 4-amino-8,9-dihydro-8,8-dimethyl-2-p-tolylbenzo(g)pteridin-6(7H)-one by following the procedure of Example 1.

Example 6

Reaction of 7.35 g. of 4,6-diamino-2-(p-methoxyphenyl)-5-nitrosopyrimidine with 3.7 g. of 1,3-cyclohexanedione gives 4-amino-8,9-dihydro-2-p-methoxyphenylbenzo(g)pteridin-6(7H)-one by following the procedure of Example 2.

Example 7

By following essentially the procedure of Example 1, reaction of 8.52 g. of 4,6-diamino-5-nitroso-2-(3,4-dichlorophenyl)pyrimidine with 4.62 g. of 5,5-dimethyl-1,3-cyclohexanedione yields 4-amino-8,9-dihydro-8,8-dimethyl-2-(3,4-dichlorophenyl)benzo(g)pteridin-6(7H)-one.

*Example 8*

By following essentially the procedure of Example 1, reaction of 6.45 g. of 4,6-diamino-5-nitroso-2-(p-trifluoromethylphenyl)pyrimidine with 4.62 g. of 5,5-dimethyl-1,3-cyclohexanedione yields 4-amino-8,9-dihydro-8,8-dimethyl - 2 - (p-trifluoromethylphenyl)benzo(g)pteridin-6(7H)-one.

While the compounds prepared according to Examples 4, 5, 6 and 8 have a substituent in the para position, it should be understood that compounds which have a substituent in the ortho- or meta- position or which are disubstituted, are prepared precisely as indicated in the illustrative examples.

The novel compounds for Formula 1 can be administered in a wide variety of oral or parenteral forms, alone, or in combination with other active compounds. They can be associated with a pharmaceutical carrier which can be a solid or a liquid in which the compound is dissolved, dispersed or suspended. The solid compositions can take the form of tablets, powders, capsules, pills and the like, preferably in unit dosage forms. The liquid compositions may take the form of solutions, emulsions or suspensions.

The novel compounds of Formula I are useful in experimental pharmacology and are effective, in vivo, against herpes simplex.

What is claimed is:
1. A compound of the formula:

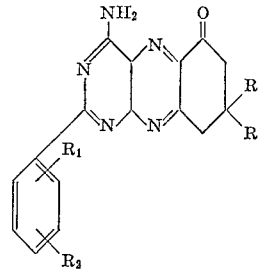

wherein R is a member of the group consisting of hydrogen, and lower alkyl, $R_1$ and $R_2$ are selected from the group consisting of hydrogen, lower alkyl, lower alkoxy, trifluoromethyl and halogen having an atomic weight less than 80.

2. 4-amino-8,9-dihydro-8,8-dimethyl-2-phenylbenzo(g)pteridin-6(7H)-one.

References Cited in the file of this patent
UNITED STATES PATENTS
2,581,889  Timmis _____ Jan. 8, 1952